(12) United States Patent
Pallister et al.

(10) Patent No.: US 11,403,108 B2
(45) Date of Patent: Aug. 2, 2022

(54) EXCEPTION HANDLING

(71) Applicant: Graphcore Limited, Bristol (GB)

(72) Inventors: James Pallister, Bristol (GB); Jamie Hanlon, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/322,598

(22) Filed: May 17, 2021

(65) Prior Publication Data

US 2021/0373900 A1    Dec. 2, 2021

(30) Foreign Application Priority Data

May 27, 2020 (GB) ...................... 2007912

(51) Int. Cl.
*G06F 9/38* (2018.01)

(52) U.S. Cl.
CPC .......... *G06F 9/3861* (2013.01); *G06F 9/3826* (2013.01); *G06F 9/3828* (2013.01); *G06F 9/3834* (2013.01); *G06F 9/3857* (2013.01); *G06F 9/3867* (2013.01)

(58) Field of Classification Search
CPC .... G06F 9/3861; G06F 9/3871; G06F 9/3867; G06F 9/3865; G06F 9/3857; G06F 9/3826; G06F 9/3828; G06F 9/3834; G06F 11/0772; G06F 11/0703; G06F 13/1615

See application file for complete search history.

(56) References Cited

U.S. PATENT DOCUMENTS

| 5,109,381 | A | 4/1992 | Duxbury |
| 6,243,786 | B1 | 6/2001 | Huang |
| 7,394,288 | B1 * | 7/2008 | Agarwal ............... H03K 19/177 326/39 |
| 8,677,103 | B1 * | 3/2014 | Barash ................. G06F 9/3871 712/225 |

(Continued)

FOREIGN PATENT DOCUMENTS

EP    1004959 A2    5/2000

OTHER PUBLICATIONS

Search and Examination Report dated Feb. 23, 2021 for Patent Application No. GB2007910.9.

(Continued)

*Primary Examiner* — Courtney P Carmichael-Moody
(74) *Attorney, Agent, or Firm* — Haynes and Boone, LLP

(57) ABSTRACT

A processor includes: a memory; an execution pipeline having a plurality of pipeline stages for executing an operation on data provided to the execution pipeline and storing a result of the operation into the memory; a receive pipeline having a plurality of pipeline stages for handling incoming data to the processor and storing the incoming data into memory; context status storage for holding an exception indicator of an exception encountered by the receive pipeline whilst it is handling incoming data; the receive pipeline being configured to determine that an exception has been encountered in one of its pipeline stages and to delay committing the exception indicator to the context status storage until a final one of its pipeline stages and to continue to receive and store incoming data into the memory until the exception indicator has been committed.

28 Claims, 11 Drawing Sheets

(56) References Cited

U.S. PATENT DOCUMENTS

| | | |
|---|---|---|
| 2002/0078334 A1* | 6/2002 | Roth ................. G06F 9/3865 712/E9.06 |
| 2009/0006905 A1 | 1/2009 | Luick |
| 2019/0155328 A1 | 5/2019 | Knowles |

OTHER PUBLICATIONS

Smith, et al., "Implementing Precise Interrupts in Pipelined Processors", IEEE Transactions on Computers, vol. 37, May 1988, pp. 562-573.

* cited by examiner

EXCEPTION HANDLING

CROSS-REFERENCE TO RELATED APPLICATIONS

The present application claims priority to United Kingdom's Patent Application No. 2007912.5, filed on May 27, 2020, the disclosure of which is hereby incorporated herein by reference in its entirety.

TECHNICAL FIELD

The present disclosure relates to the handling of exceptions in a processing unit having an execution pipeline.

BACKGROUND

There has been an increased focus on the development of computers which are particularly suitable for executing machine intelligence graphs. Machine intelligence graphs consist of many nodes connected to one another via edges, when nodes represent a certain processing requirement on their individual data and edges represent data to be transferred between nodes. This structure allows for a high level of parallelism to be performed, and there have been developments in computer architectures to support such high level of parallelism.

Once such architecture has been developed by Graphcore and is described for example in GB applications Nos. 1717295.8; 1717304.8; 1717299.0, the contents of which are herein incorporated by reference. The computer developed by Graphcore comprises an arrangement of multiple tiles on the same chip (i.e. same die), each tile comprising its own separate respective processing pipeline and memory (including program memory and data memory). Separate portions of program code can be run in parallel on different ones of the tiles. The tiles are connected together via an on-chip interconnect which enables the code run on the different tiles to communicate. That is, data may be exchanged over the on-chip interconnect. Data may be transmitted from one tile to another tile to act as an input for a process on the other tile. The data memory may be utilised by the in-tile processing pipeline for load and store operations accomplished by the pipeline. In addition, the data memory can be used to store data which is incoming to the tile from another tile on the same chip. Furthermore, the data memory can be used to store data incoming from sources external of the chip. The chip has an external exchange mechanism which allows it to receive data from externally of the chip and to provide that data to one or more tiles on the chip.

The processing pipeline on each tile may itself run multiple concurrent threads on the tile. In that case, a scheduler can be provided on each tile to support interleaving of multiple threads on the same tile through the same execution pipeline.

When a computer is operating it can encounter exceptions. Exceptions indicate unusual and potentially problematic execution conditions, that is a divergence from the normal execution behaviour of a program. When an exception is encountered, it is expected that the computer will have the ability to raise a signal which indicates externally of the chip that an exception has been encountered. This enables a user to establish that something has gone wrong in the behaviour of the computer. There are many possible causes of exceptions. What is important is to be able to ascertain the cause of an exception, and in some cases to enable a computer to recover from the exceptions.

It is important when examining the cause of an exception to be able to have access to the state of the computer at the time that the exception occurred. This can be a particular challenge when dealing with exceptions in execution pipelines.

It is also important for verification of a processor that the state of the processor around exceptions can be modelled, in order that exception behaviour can be tested.

SUMMARY

The present inventor has recognised that there are particular challenges to be met in the context of a processing unit which comprises two pipelines which may operate independently. In the Graphcore computer referenced in the background, multiple tiles may exchange data between them. Data to be exchanged may be generated by tiles on the chip or may be received from a source externally of the chip. Receive logic on each tile handles the incoming data to the tile, whether it arrives from an internal (on-chip) source or from an external (off chip) source. Where the receive logic itself is pipelined, it is challenging to ensure that any exception which is raised is correctly handled within the tile, and also that the state of the tile at the time at which the exception was raised is correctly available for subsequent inspection. More particularly, the present disclosure addresses the challenge of timing exception events raised by the receive logic to coincide correctly with an instruction stream being executed in the tile.

One aspect provides a processor comprising:
memory;
an execution pipeline having a plurality of pipeline stages for executing an operation on data provided to the execution pipeline and storing a result of the operation into the memory;
a receive pipeline having a plurality of pipeline stages for handling incoming data to the processor and storing the incoming data into memory;
context status storage for holding an exception indicator of an exception encountered by the receive pipeline whilst it is handling incoming data;
the receive pipeline being configured to determine that an exception has been encountered in one of its pipeline stages and to delay committing the exception indicator to the context status storage until a final one of its pipeline stages and to continue to receive and store incoming data into the memory until the exception indicator has been committed.

In some embodiments, the execution pipeline is configured to check the context status register when retiring an instruction and on detection of the exception indicator in the context status storage to cause an exception signal to be raised.

The receive pipeline may be configured to drop subsequent incoming data after the exception indicator has been committed.

In some embodiments, the receive pipeline is configured to process a first incoming data word in sequential pipeline stages, and to process one or more subsequent incoming data words in successive ones of the pipeline stages, whereby multiple pipeline stages are operating on successive data words at the same time.

In some embodiments the pipeline stages of the receive pipeline are timed according to a clock signal. The pipeline stages of the execution pipeline may also be timed according to a clock signal. Where the clock signals are the same frequency (or the same clock signal) the exception handling behaviour can be consistent between execution pipeline and receive pipeline exceptions.

In some embodiments, the receive pipeline is configured to detect the exception in the first one of the pipeline stages.

In some embodiments, the receive pipeline is configured to receive the incoming data in successive receive steps of successive data words, and the number of receive steps which cause any incoming data word to be stored into memory between detection of the exception and commitment of the exception indicator correspond to one less than a number of pipeline stages in the receive pipeline. In some scenarios there will be a data word received in each receive step, but in other scenarios a data word may not be received in a possible receive step.

In some embodiments, the execution pipeline and the receive pipeline operate contemporaneously, the processor comprising access logic for resolving memory write conflicts to the memory of data from the execution pipeline and the receive pipeline.

The access logic may be configured to priorities a memory write of data from the receive pipeline over data from the execution pipeline in the event of a memory access conflict.

Another aspect of the invention provides a method of handling exceptions in a processor comprising: memory; an execution pipeline having a plurality of pipeline stages for executing an operation on data provided to the execution pipeline and storing a result of the operation into the memory; a receive pipeline having a plurality of pipeline stages for handling incoming data to the processor and storing the incoming data into memory; and context status storage for holding an exception indicator of an exception encountered by the receive pipeline whilst it is handling incoming data, the method comprising:

determining by the receive pipeline that an exception has been encountered in one of its pipeline stages, committing the exception indicator to the context status storage after a delay until a final one of the pipeline stages of the receive pipeline, and continuing to receive and store incoming data into the memory until the exception indicator has been committed.

In some embodiments, the execution pipeline checks the context status register when retiring an instruction and on detection of the exception indicator in the context status storage causes an exception signal to be raised.

In some embodiments, the receive pipeline drops subsequent incoming data after the exception indicator has been committed.

In some embodiments, the receive pipeline processes a first incoming data word in sequential pipeline stages, and processes one or more subsequent incoming data words in successive ones of the pipeline stages, whereby multiple pipeline stages are operating on successive data words at the same time.

The pipeline stages of the receive pipeline and the execution pipeline may be timed according to a clock signal.

The receive pipeline may detect the exception in a first one of the pipeline stages.

In some embodiments, the incoming data comprises successive data words, and the number of data words which are stored into memory between detection of the exception and commitment of the exception indicator correspond to one less than a number of pipeline stages in the receive pipeline.

The execution pipeline and the receive pipeline may operate contemporaneously, but asynchronously, the processor comprising access logic for resolving memory write conflicts to the memory of data from the execution pipeline and the receive pipeline.

The access logic may prioritise a memory write of data from the receive pipeline over data from the execution pipeline in the event of a memory access conflict.

BRIEF DESCRIPTION OF THE DRAWINGS

For a better understanding of the present invention, and to show how the same may be carried into effect, reference will now be made by way of example to the accompanying drawings.

FIG. 5 is a timing diagram showing when a receive exception is committed to a context register of the processing unit;

FIG. 6 is a timing diagram showing when an execution pipeline exception is committed to a context register;

DETAILED DESCRIPTION

The present disclosure concerns exceptions which arise during operation of a processing unit. Some exceptions are "fatal". That is, the processing unit is not expected to recover itself from the exception. What is important is that the exception is flagged externally of the processing unit, for example to a debug tool or other inspection tool such that the cause of the exception can be investigated to prevent the same problem occurring again. The present disclosure applies to exceptions which arise in normal operation and/or in a debug context.

To enable the cause of exceptions to be determined, state associated with the exceptions is recorded. This state comprises the state at which the processing unit had reached when the exception was raised, and may include additional state indicative of the exception itself in exception registers discussed later.

In inspecting and debugging exceptions, it is important that the underlying state of the processing unit at the time at which the exception was raised provides useful and consistent information. This provides a number of complex challenges.

These are discussed further herein with the solutions offered by the present disclosure.

Figure 1:
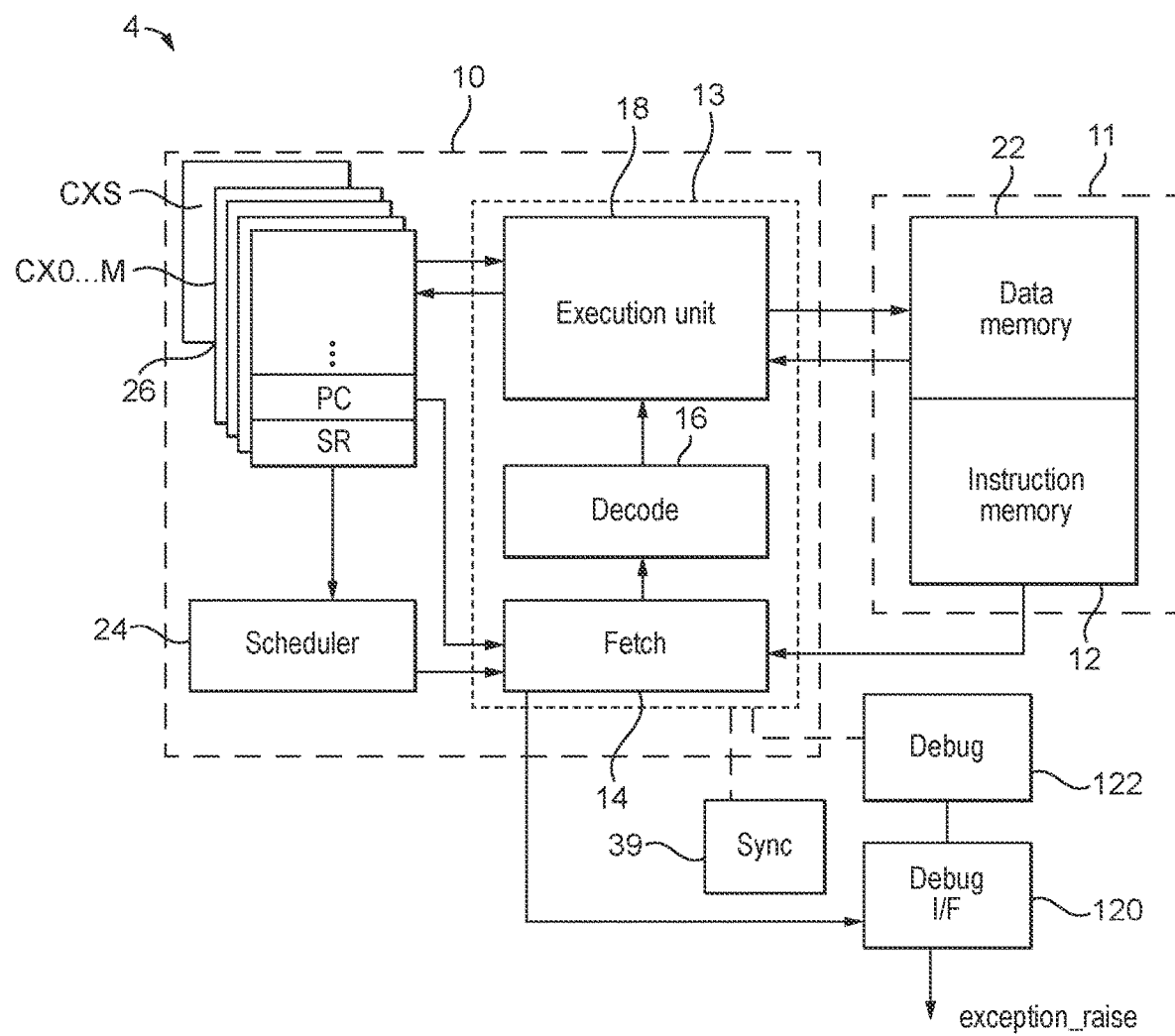
FIG. 1 is a schematic view of a processing unit.

Firstly, by way of non-limiting example, an example of a processor module 4 is described with reference FIG. 1. The processor module 4 may be one tile of an array of like processor tiles on the same chip, or may be implemented as a standalone processor on its own chip. The processor module 4 in this example comprises a processing unit 10 and a local memory 11 (i.e. on the same tile in the case of a multi-tile array, or same chip in the case of a single processor chip). The memory 11 comprises an instruction memory 12 and the data memory 22 (which may be implemented in different addressable memory units or different regions of the same addressable memory unit). The instruction memory 12 stores machine code instructions to be executed by the processing unit 10. The data memory 22 stores both data to be operated on by the executed code, and data output by the executed code (e.g. as a result of such operations). In addition, the data memory may receive data written to the tile from a source outside the tile via receive logic at a receive interface 17.

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor instruction set, consisting of a single opcode and zero or more operands. Note that operands are indicated by instructions. They may be immediate and encoded by a compiler, or accessed from registers. Data in the registers may have been loaded into the registers from the data memory 22. This could be data which has been stored as a result of previous operations by the tile, or data incoming from an external data source via the receive interface 17.

Within the processing unit 10, multiple different threads from the instruction memory 12 can be interleaved through a single execution pipeline 13 (though, typically, only a subset of the total threads stored in the instruction memory can be interleaved at any given point in the overall program). The multithreaded processing unit 10 comprises:

a plurality of context register files 26, each arranged to represent the state (context) of a different respective one of the threads to be executed concurrently;

a shared processing pipeline 13 that is common to the concurrently executed threads; and a scheduler 24 for scheduling the concurrent threads for execution through the shared pipeline in an interleaved manner, preferably in a round robin manner. The processing unit 10 is connected to the shared instruction memory 12 common to the plurality of threads and the shared data memory 22 that is again common to the plurality of threads.

The processing pipeline 13 comprises a fetch unit 14, a decode unit 16 and an execution unit 18 comprising an execution pipeline. The execution pipeline will be described in more detail later, and it may perform arithmetical and logical operations, address calculations, load and store operations and other operations defined by the instruction set architecture. Each of the context register files 26 comprises a respective set of registers for representing the program state (context) of a respective thread. The context register files include context registers where exception status for that thread may be stored. The context register files also include registers for holding exception status for the receive logic at receive interface 17. In some embodiments, the threads may be worker threads that are scheduled or managed by a supervisor thread. The supervisor thread performs control functions for the tile, and may additionally process its own incoming data to the tile. The supervisor thread may be associated with its own context registers which include registers for holding exception status of the receive logic at receive interface 17. These are discussed in more detail later.

The fetch unit 14 is connected so as to fetch instructions to be executed from the instruction memory 12 under control of the scheduler 24. The scheduler 24 is configured to control the fetch stage to fetch an instructions from each of a set of concurringly executing threads in turn in a repeating sequence of timeslots, thus dividing the resources of the pipeline 13 into a plurality of temporarily interleaved timeslots. For example, the scheduling scheme could be round robin or weighted round robin.

The fetch stage 14 has access to a program counter (PC) of each of the contexts. For each respective thread, the fetch unit 14 fetches the next instruction of that thread from the next address in the program memory 12 as indicated by the program counter. The program counter increments each execution cycle and less branch by a branch instruction. The fetch unit 14 then passes the fetched instruction to the decode stage 16 to be decoded, and the decode unit 16 then passes an indication of the decoded instruction to the execution unit 18 along with the decoded addresses of any operand registers specified in the instruction, in order for the instruction to be executed. The execution unit 18 has access to the operand registers and two control registers which it may use in executing the instruction based on the decoded register addresses. If the instruction defines a memory access (load or store) load store logic of the execution unit 18 (to be described later) loads a value from the data memory 22 into an operand register of the respective thread, or stores a value from an operand register of the respective thread into the data memory 22, in accordance with the instruction.

Items can be written into the memory 11 from two different sources. A first source is the execution pipeline which processes data incoming to it according to instructions which have been fetched from the instruction memory and writes back processed data into the memory. A second source that can write data to the memory is receive logic 17 at the receive interface of the processing unit. This receive logic may itself be pipelined, and is sometimes referred to herein as the receive pipeline. The receive logic 17 receives data incoming to the processing unit from an external source. Possible external sources of data into the processing unit are discussed later. Exceptions may be raised by processing operations in the execution pipeline and/or in the receive logic.

Figure 8:
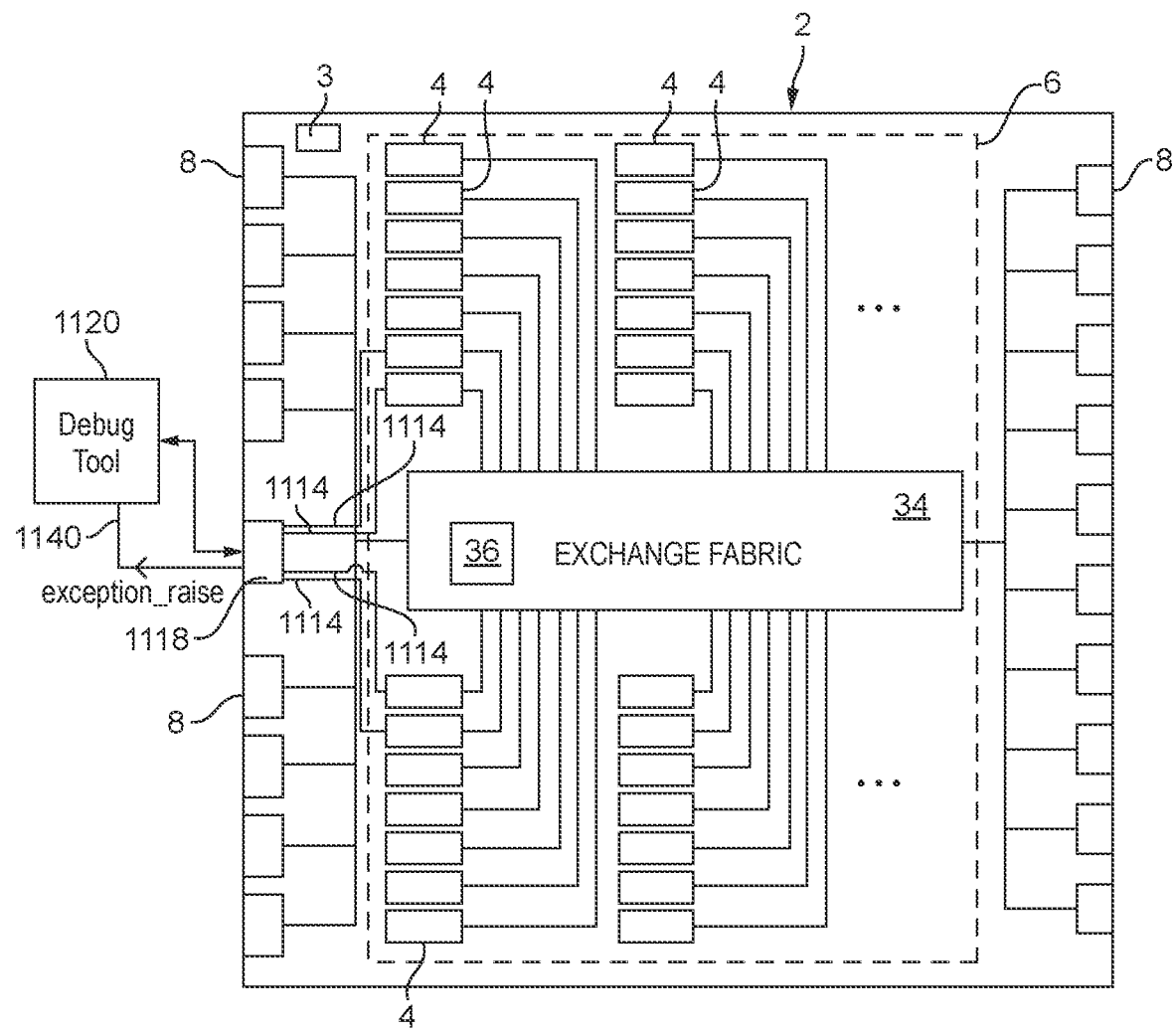
FIG. 8 is a schematic diagram of a chip with multiple tiles.

The receive pipeline and the execution pipeline are controlled by a clock signal with the same frequency—that is with the same delay between pipeline stages. This could be the same clock, or clock signals having the same frequency from a common clock source, derived from a processor clock. An example of a clock 3 is shown in FIG. 8, but for reasons of clarity its wires connecting it to the pipelines are not shown. Note however that operation of the pipelines may be asynchronous.

Figure 2:
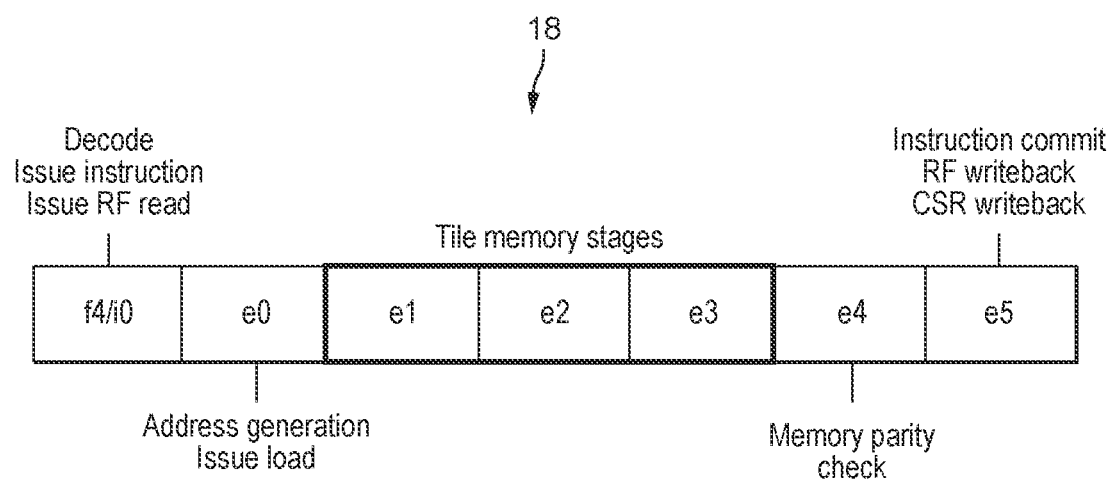
FIG. 2 is a schematic view of an execution pipeline.

FIG. 2 shows the stages of the execution pipeline IS. These execution stages define where the functional behaviour of an instruction occurs. A prior stage f4/i0 represents decode and issue of instructions into the pipeline 18. Address generation and memory access for loads, stores and sends are issued in stage e0. Note that 'send' is an instruction to access data from memory and transmit it from the tile. Stages e1, e2 and e3 are referred to as to the memory stages. Accesses to the memory are pipelined over four stages, an input stage, a RAM macro, an output stage for the RAM macro and a final output stage. However, the pipeline depth is referred to three stages since it does not introduce logic before the first stage (taking input from e0) or after the last stage (providing output to e4). In stage e4 of the pipeline there is a memory parity check and loads are picked up. All execution is speculative until stage e5 where, in the absence of exceptions, state updates are committed back to the context register files. There is one exception to this: stores are issued in stage e0 and cannot subsequently be prevented from committing to memory. This causes a complication when handling exceptions.

A further complication occurs because both the execution pipeline and the receive logic can write to the memory.

Depending on when exception events are detected, it may not be possible to prevent all architectural state updates associated with the cause. Exception events are therefore categorised with the following different levels of precision:

Precise exception events are those where state is consistent with the instruction pre-commit Semi-precise exception events are those where the state is consistent with the instruction post-commit. Semi-precise exception events apply to store instructions only, Super imprecise exceptions are those where the state is consistent with instruction post-commit, but not in the context of store instructions.

The present disclosure addresses the relationship between exceptions which are raised by the receive logic at receive interface 17 and the processing of instructions being executed. In particular the present disclosure addresses super imprecise events. The purpose of a retirement exception is to propagate an exception event that is asynchronous with respect to the instruction stream of a context, into that context to prevent it from further execution.

Figure 4:
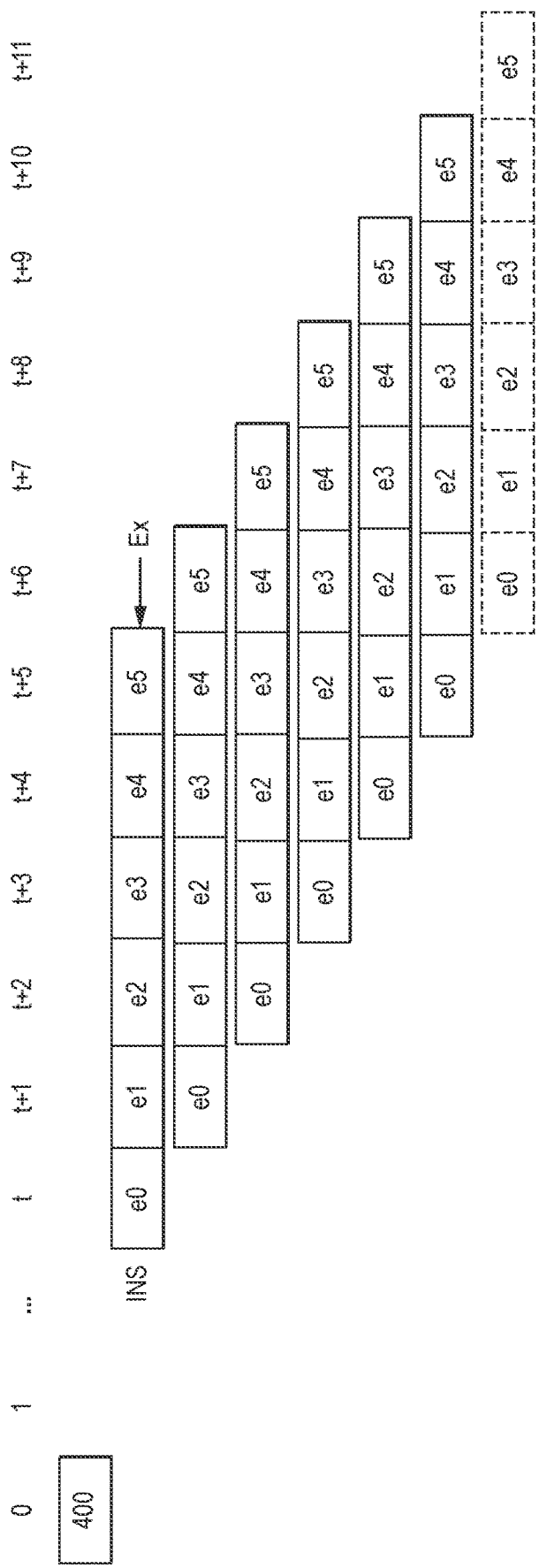
FIG. 4 is a timing diagram showing when a retirement exception is committed.

Reference is made to FIG. 4 to describe the example operation of the execution pipeline on the detection of retirement exception events. At that time t it is assumed that a retirement exception event was logged. For the purposes of explanation, a retirement exception event 400 is shown at time 0 and the exception is logged at time 0. Note that in examples, the exception event may be a tile exception event detected by the execution pipeline or something else in the tile, or a receive exception which had been logged in a final stage of the receive pipeline.

At time t, a next retiring instruction INS is received. The receive exception has been logged (at time 0), so if an instruction was to retire in cycle t+5 (i.e. in its e5 stage), then it would raise a retirement exception Ex. At that point, the exception Ex is raised, and a signal is sent to prevent further instruction issue into that context. FIG. 4 shows at t+6 instruction issue is prevented (illustrated by the dashed boxes) due to the exception raised at t+5. In other words, the dashed box represents a state where that particular context is now excepted because the exception has been raised, i.e. instruction issue is prevented. Note that this mechanism allows for up to five stores to commit to memory after the exception event occurs. This is shown by the grayed-out boxes in FIG. 4, representing five exemplary potential super imprecise stores.

Figure 9A:
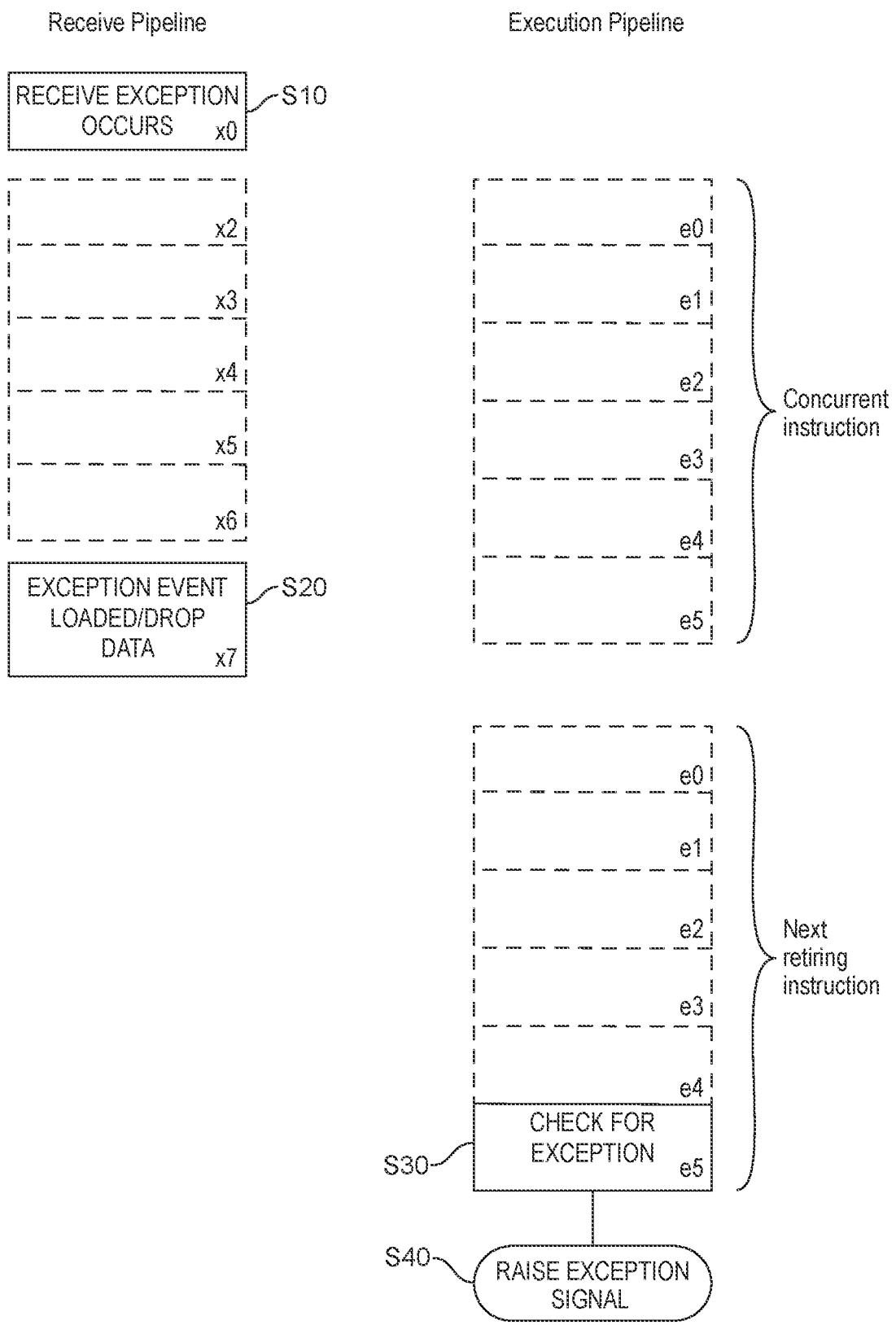
FIG. 9A is a flow diagram showing behaviour of the receive pipeline when encountering receive exceptions.

Exception events are logged by the receive logic at receive interface 17 when they occur. A tile instruction raises a receive exception when it retires and sees that an exception has been logged by the receive logic. Reference is made to FIG. 9A which shows in general terms an example of the sequence of events in receive exceptions described more fully herein. At step S10 it is detected than an exception event has occurred. Exception events which are relevant herein are those which can occur asynchronously to the instruction stream. Some examples are given later. At step S20 the exception event is logged. The timing at which the exception event is logged is discussed later with reference to the receive logic pipeline. The exception may be logged by writing it into a context register file for holding exception status for asynchronous events, such as those arising from the receive logic. When an instruction retires, part of the instruction retirement process is to check the exception status register for asynchronous events, at step S30. If it detects that an exception event has been logged, the instruction raises an exception at its retirement S40. The timing at which this is done with respect to the execution pipeline is discussed later.

Figure 9B:
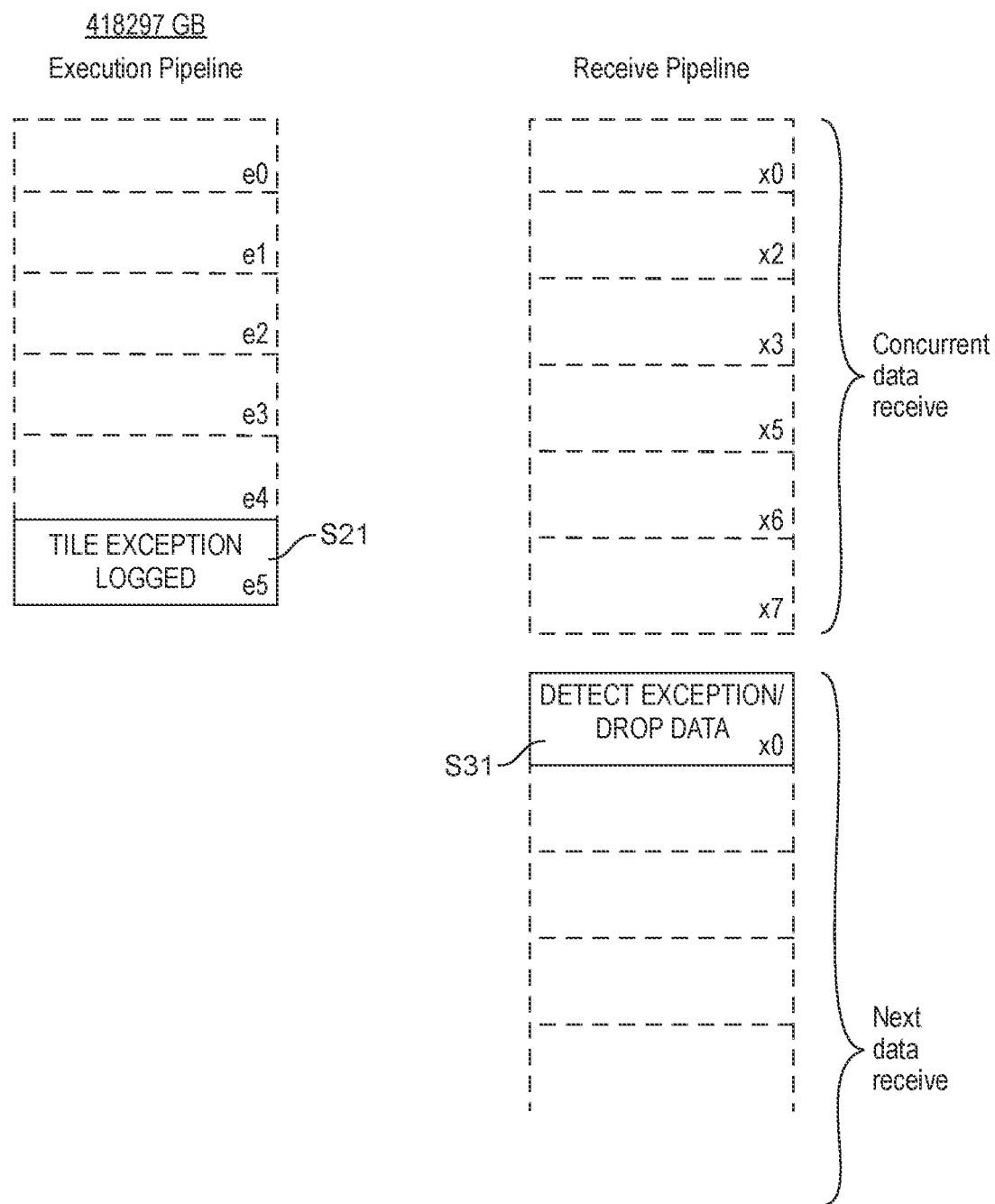
FIG. 9B is a flow diagram showing behaviour of the receive pipeline when encountering tile exceptions.

FIG. 9B shows an example alternative flow which concerns the relationship between exceptions which are raised by the execution pipeline of the tile and the operation of the receive logic at the receive interface 17. At step S21 a tile exception event is logged at a final stage in the execution pipeline. A step S31 each time data is received, the receive logic checks whether or not a tile exception event has been logged. If it has, the receive logic ceases to receive data from that point. However the exception is not logged until a final stage of the receive pipeline at step S41. This is discussed in more detail later.

The following are examples of exceptions corresponding to events that can occur asynchronously to the invention thread execution. Each carries a particular exception type to be indicated in an exception register.

memory parity error, causes exception type MF RR (logged by memory stages of the fetch unit and execution pipeline, raised at retirement)

exchange receive error causes exception type ERERR (logged by receive logic, raised at retirement)

exchange parity error causes exception type EERR (logged by receive logic, raised at retirement)

retirement break causes exception type TEX CPT_RB RK (a debug retirement exception raised by the tile instruction).

For each of the above exceptions, the event is logged by writing one of the context registers which may then be checked at retirement of an instruction. According to the present disclosure, retiring instructions are permitted to commit to memory before they raise a retirement exception.

Figure 3:
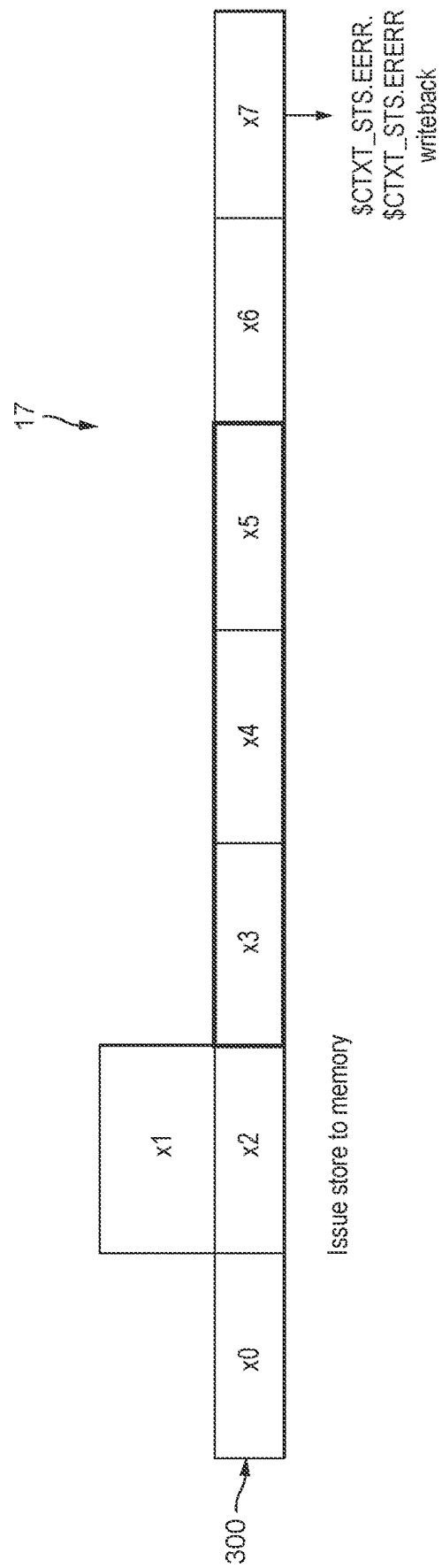
FIG. 3 is a schematic view of a receive logic pipeline.

Reference will now be made to FIG. 3 to describe an example of the receive logic at the receive interface 17. The receive logic is a pipeline comprising eight stages which are labelled x0 . . . x7 in FIG. 3. (Note that x1 is an optional delay stage which is used in certain circumstances which are not outlined here.) The received pipeline is aligned with the execution pipeline 13 by the point at which accesses are issued to the memory. With a load/store-receive conflict, a receive exception will correspond to the tile processor instruction that performed the memory access. As such, stage x2 corresponds to stagee0, and stage x7 corresponds to e5, the instruction commit point. Context Status Register (CSR) writeback is carried out in stage x7. Stage x2 initiates memory access via a memory access unit. Before describing the receive pipeline, reference is made to FIG. 10 to explain access to the memory 11.

Figure 10:
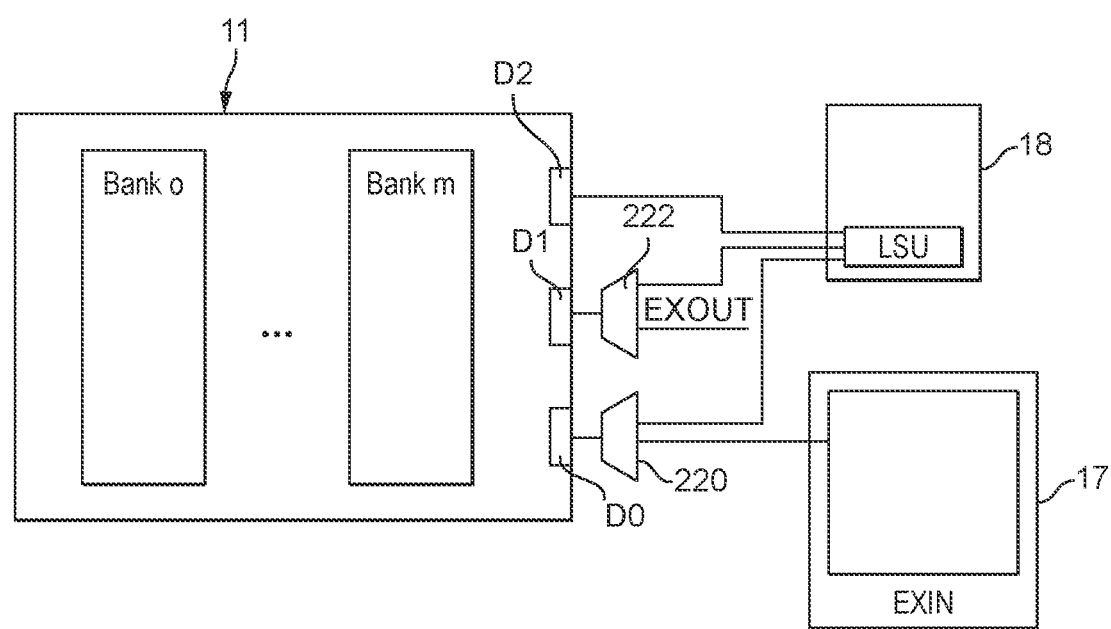
FIG. 10 is a schematic view of memory, showing its access ports.

FIG. 10 is a schematic view of an example of the memory 11 which shows its access ports and the execution pipeline 18 and receive pipeline 17. The example of FIG. 10 illustrates the tile memory 11. The tile memory may contain multiple banks (Bank 0 . . . Bank m) of RAM macros, for example each RAM macro may have a capacity of 16 KB. Multiple sets of banks may be provided in some embodiments. Each tile memory has three access ports. Port D0 is a read/write port. Port D1 and port D2 are read only. Writes to the memory may come from one of two places. The loadstore unit LSU which operates at stage s e0 to e5 of the tile execution pipeline 18 commits to memory the store which was issued in stage e0. Stores to memory which are made by the execution pipeline 18 are a result of instructions being executed earlier in the execution pipeline, as described earlier. The receive pipeline 17 of an EXIN unit (shown in FIG. 10) operates to store data received from outside the tile.

The example receive pipeline illustrated in FIG. 3 operates to receive data (exchange data 300) incoming to the tile. The seven stages of operation of the exchange receive pipeline are shown in FIG. 3. In the first stage x0, data 300 is received. Ignoring for now the stage x1 because it is not pertinent to the present disclosure, at the next stage x2, a store is issued to the memory. Stages x3, x4 and x5 represent tile memory stages. These correspond to the tile memory stages of the execution pipeline, and are as described above with reference to the operation of the memory. Stage x6 is a delay stage, which can be needed in some embodiments for timing purposes Stage x7 represents the state commit point where state is written to the context registers. At this point, the following states are written into exception registers which form part of exception register 38a, 38b, see FIG. 7. They are named $CTXT_STS.EERR (38a) and $CTXT_STS.ERERR (38b). The EXIN unit (which is shown in FIG. 10) denotes the logic for committing the store to memory. An access conflict within a specified range of memory may occur when two valid memory accesses target that range simultaneously. For example, if the load store unit LSU and the EXIN unit attempt to access the memory via port D0 at the same time, this constitutes a memory access conflict.

A multiplexor 220 is connected to receive potential accesses from the LSU unit and the EXIN unit to permit either the LSU unit or the EXIN unit to access the memory. The output of the multiplexor 220 is connected to the port D0. Note that port D2 is a read only port connected to the load/store unit. Port D1 is a read only port which can be read, via multiplexer 222, by the load/store unit or by an external exchange unit (EXOUT) for transmitting data out of the tile responsive to a 'send' instruction. This is not germane to the present invention and therefore is not discussed further herein. To resolve conflicts, in general, the read/write port (D0) has priority over the read only ports (D1, D2) since this provides consistent behaviour for all store exceptions, which are classed as super-imprecise and define to always update the memory contents. For a conflict between a load operation at the load/store unit and the EXIN unit, the EXIN unit takes priority and stores to memory. In the case of a conflict between the load/store unit operating a store, and the EXIN unit operating store, the EXIN unit takes priority and stores to memory. This is performed under the control of the multiplexor 220 The multiplexer 220 is controlled by the receive logic using addresses stored in the context status register. In the case of an access conflict between an instruction being executed by the execution pipeline seeking to store data to memory, and the receive logic seeking to store data to memory, the receive logic logs the exception but the instruction will raise an exception before retirement (because it has detected the conflict) so the final state is an exception emanating from the instruction, with the receive exception logged, but not raised.

With a load store receive conflict, the receive exception will correspond to the tile processor instruction that performed the memory access. As such, stage x2 of the exchange receive pipeline 17 corresponds to stage e0 of the execution pipeline 18. Stage x7 of the exchange receive pipeline 17 corresponds to stage e5 of the execution pipeline 18, which is the instruction commit point.

The updates to the exception register status $CTXT_STS.ERERR and $CTXT_STS.EERR are performed at stage x7 of the receive exchange pipeline, and are consistent with the commit point of the tile execution pipeline.

The receive interface 17 logs exceptions via writes to the exception register 38a, 38b $CTXT_STS.ERERR or $CTXT_STS.EERR. Exchange receive and parity errors are raised independently, so it is possible that these can be set in the same cycle.

The exception behaviour of the receive logic is consistent with the state of the tile processor by delaying any effects of receive exceptions to the tiles e5 commit point. This ensures:
1. That any receive exception event that is dependent on the state of the tile is raised at the commit point of the instructions that it corresponds to. Note that if the exception was logged at some earlier point, it might appear to be raised in the past of the corresponding instruction.
2. That any speculative effect of an instruction, (such as a read from memory) does not affect the receive exception behaviour until that speculation is confirmed at the e5 commit point.

Even though writes to memory are squashed in stage x0 of the receive pipeline logic, due to timing constraints, the effect of delaying receive exceptions to stage x7 is that any data received in a subsequent six cycle window (pipeline stages x2 to x7) is written to memory.

Therefore, in the worst case, after a receive exception occurs, seven data words are written to memory: the one responsible for the exception and six more following it. This behaviour is consistent for all receive exceptions.

The receive logic at the receive interface 17 starts dropping data after it has detected an exception event if one of the following occurs:
    a) a tile processor exception has been raised,
    b) any receive error has been logged,
    c) an exchange parity error has been logged.

In one embodiment, only the first receive exception may be logged.

Figure 5:
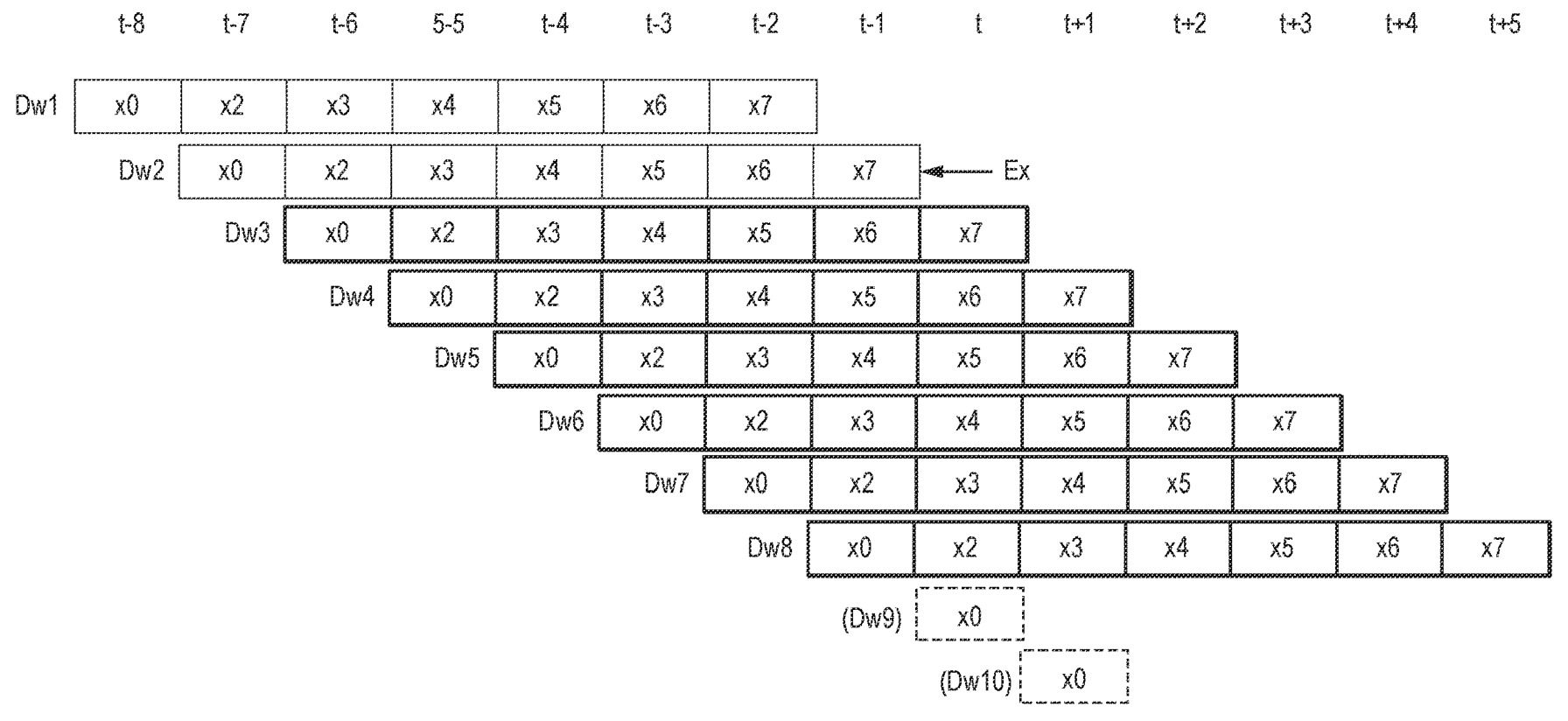

The timing of imprecise stores is the same as that for receive exceptions. After the tile exception is committed, up to the pipeline depth, from stages x2 to x7, of stores can commit to memory. When a receive exception occurs, it causes the next tile processor instruction that completes its execution to raise an exception upon retirement. The receive exception causes a write to $CTXT_STS.ERERR/EER in stage x7 and in the following cycle the receive exception event is signalled to the tile processor by the value in that register. This can be seen from FIGS. 5 and 6 which illustrate examples of the exception timing. Reference will now be made to FIG. 5.

When a receive exception occurs, there is a window of six cycles before receive data will be dropped. This is due to the depth of the receive pipeline between the memory interface in the exception logic. FIG. 5 illustrates an example of this timing with data arriving on each cycle. For the purposes of explanation only, datawords DW1 . . . DW8 are shown received in sequence. DW1 is received in cycle t−8, DW2 in cycle t−7, etc. Two excepted data words DW9 and WD10 are also shown (described below).

At time t−8, a data word DW1 is received into the pipeline at stage x0. The receive pipeline operates six stages x2 to x7 as described earlier to time t−2. A subsequent data word DW2 is received into stage x0 at time t−7, and the receive logic pipeline operates its stages from x2 to x7 up to time t−1. An exception is encountered in the receive interface 17 when the subsequent data word DW2 is received. The receive exception Ex is committed (by writing $CTXT_STS, ERERR or EERR to register 38a or 38b) in stage x7 of the second data word DW2 that was received and processed (at time t). Note that by this time, up to six subsequent data words (DW3, DW4 . . . DW8) may have been received and processed by the pipeline up to the point of being stored into memory. These up to six other datawords may be referred to as "imprecise stores". At the point at which the receive exception Ex is committed (at t−1), the receive logic can start dropping data words, including DW9 and DW10 shown in FIG. 5 by dashed boxes. The instruction running on the tile processor can retire at the execution stage e5. On retirement, it reads the context state register, detects the exception and signals an exception to be indicated externally of the tile. Note that this is the earliest point it can occur, because it needs to read the exception from the registers to which the receive exception was written.

Figure 6:
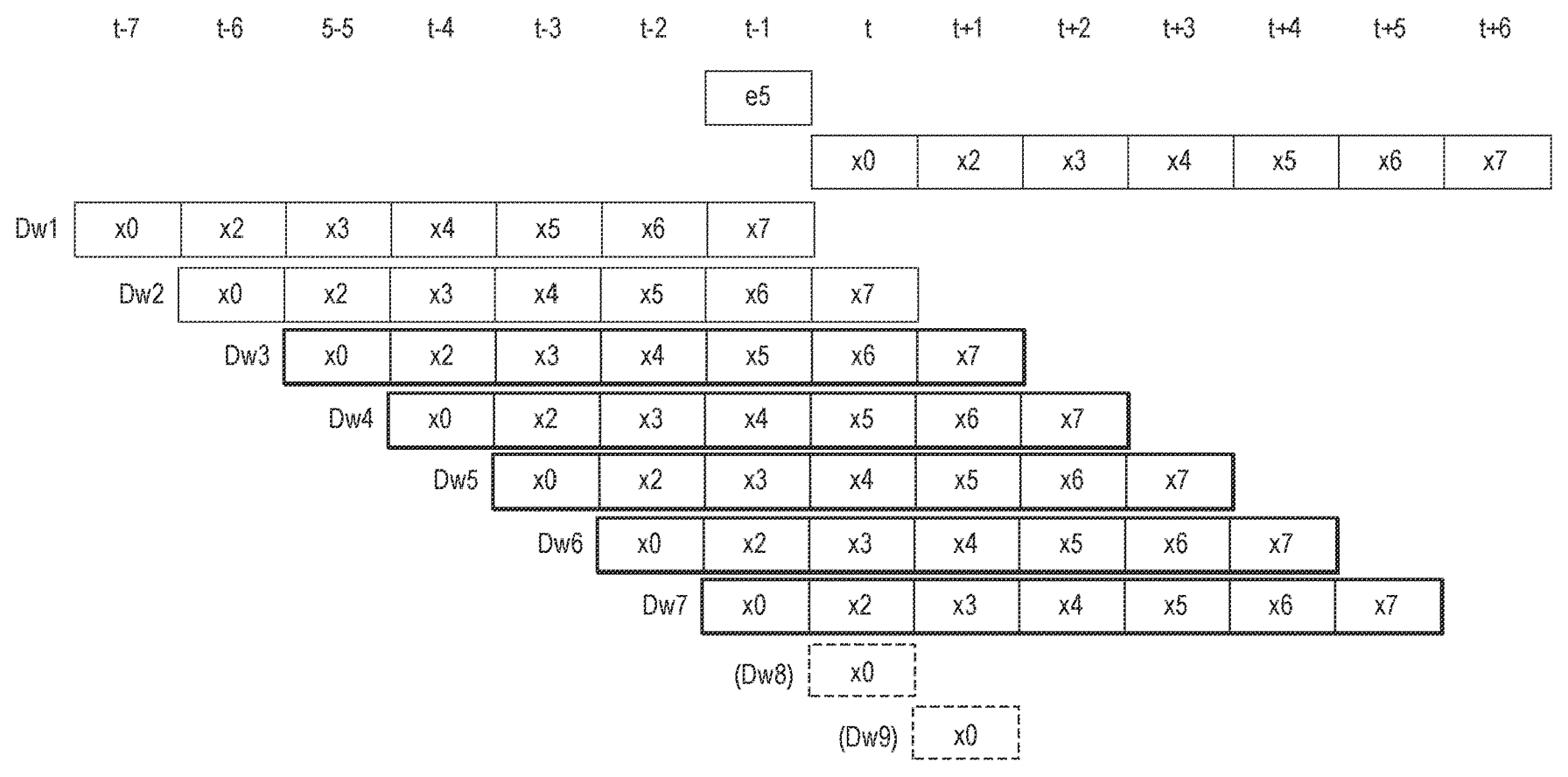

Reference will now be made to FIG. 6 to explain the timing of processor exceptions. Processor exceptions can cause the receive logic to stop, but as is the case with receive exceptions there is a latency for this to take effect. When the receive logic detects that a tile processor exception has been logged and data arrives, it signals the write to memory by writing an exception value TEXP_RERR_MODI to $CTXT_STS.ERERR, after any of the receive data already in the pipeline has been committed. The exception value TEXP_RERR_MODI can be used for debug purposes. As illustrated in the example of FIG. 6, for the purposes of explanation only, data words DW1 . . . DW7 are shown received in sequence. DW1 is received in cycle t−7, DW2 in cycle t−6, etc. Two excepted data words DW8 and DW9 are also shown (described below).

The first data word DW1' is received at time t−7 and processed by the receive pipeline. An exception is raised at stage e5 of the processor pipeline which is executing an instruction, and the exception is committed by writing to registers 38c of the context status registers $CTXT_STS at time t−1 for example, one or more of bits SU, W1, W2-W7 may be written. Subsequent data words DW2-DW7 continue to be received and stored. These may be referred to as "imprecise stores".

At time t, a data word DW8 may be received in stage x0 of the receive logic but this data word is dropped at that stage, by not signalling a write to memory. Subsequent incoming data words (e.g. data word DW9) are also dropped. In contrast to a receive exception, data words are dropped from stage x0, the first stage of the receive pipeline. A receive exception corresponding to the tile exception is not logged at stage x0 in that case. Instead it is logged at stage x7 (at time t+6). As mentioned above, in the meantime incoming data words DW2 to DW7 (referred to herein as imprecise stores) corresponding to the exception which have already been received are processed in the receive logic pipeline, including being stored in memory. Data words received after time t are to be dropped as a result of the exception raised by the execution pipeline. Two examples of such dropped data words, DW8 and DW9 are shown in faded rectangles in FIG. 6.

Figure 7:
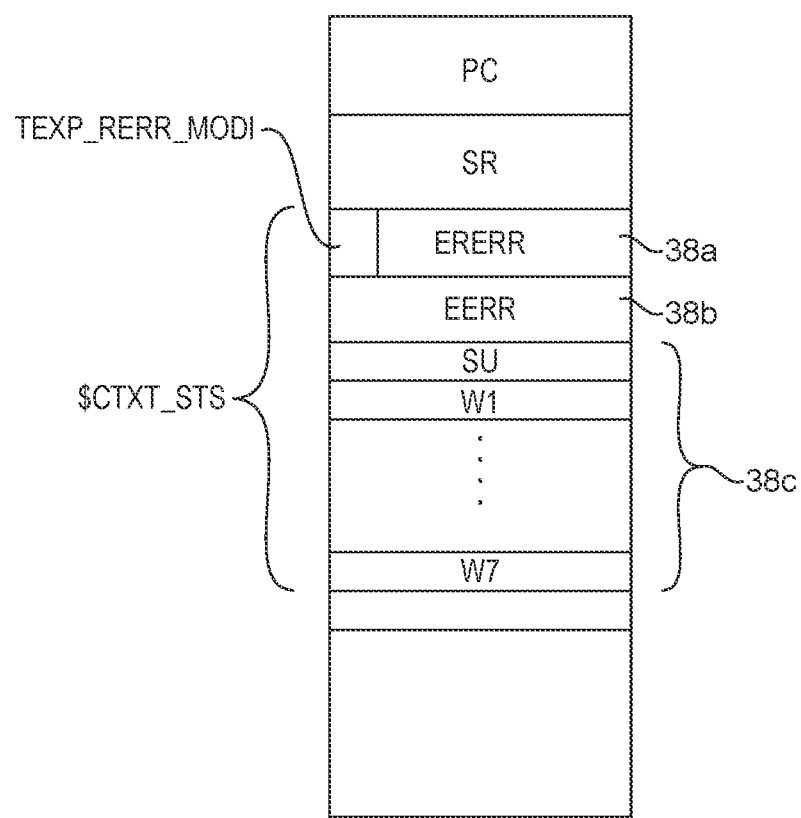
FIG. 7 is a schematic diagram showing context registers.

Reference will now be made to FIG. 7 to illustrate the context registers. FIG. 7 shows an example set of context registers which can be used to log exceptions as described above. In some embodiments, these registers may be associated with the supervisor thread which manages the allocation of threads in the tile. However, any set of context registers may be utilised. As described above, a set of context registers is available to the receive logic for logging exception events which occur at the receive logic. These are labelled for example 38a and 38b. For the sake of completeness, the context registers are also shown to include program count PC registers and status registers SR which hold status of the thread while it is operating.

In addition, the context registers include register 38c which can hold exception events relating to operation of the execution pipeline 18. For example, these can include bit SU, W1, W2 . . . . W7, each representing a status for each context. Each status can indicate the presence of an exception of any type.

In the above description, the timing of exception handling and the setting of exception raised status is discussed. There are two situations in which exceptions can arise. One group of exceptions arise during normal operation (that is, intended normal operation which is somehow interrupted due to a fault), and another set of exceptions arise in the context of debugging. As discussed above, exceptions indicate unusual and potentially problematic execution conditions, that diverge from the normal execution behavioural program. When in a debug mode, exceptions are deliberately created in order to allow debugging process to be carried out. Whether or not the chip is in a debug mode, it is important to be able to ascertain the cause of exceptions.

As discussed above, receive exceptions are logged in the context registers 38. This state can be inspected at retirement of an instruction to determine if an exception should be raised. The context registers may indicate different types of errors. For example, a memory error flag may be asserted if the particular exception relates to a parity or error check in the memory. The exception register status for each context may indicate the type of the exception (e-type), in addition to an indication as to whether or not an exception should be raised outside the processing unit. Conversely, each time data is received by the receive logic at the receive interface 17, the context status bits SU, W1 . . . W7 in register 38c are checked to see if the execution pipeline of the tile has raised an exception, to determine if the receive logic should stop receiving data.

FIG. 8 illustrates schematically the architecture of the computer comprising a plurality of tiles 4. Each tile may have an inspection interface such as a debug interface which allows access to the tile through a computer debug interface on the computer. A debug tool can access any tile via this computer debug Interface. Each tile can issue an exception raised signal. This is raised on a wire or set of wires which is connected from each individual tile to the debug interface. There, a logic circuit which function as an OR gate receives all of the exception raised wires and generates a global exception raised signal, the state of which depends on the state of the inputs to the logic. The logic is such that while any exception raised signal from an individual tile is active, the global exception raised signal will be active. The computer in the example of FIG. 8 may be provided on a single die. In addition to the array of multiple processor tiles 4, there is an on-chip interconnect 34 which allows data to be exchanged between the tiles. These are referred to as internal exchanges.

Processing and internal exchanges may be carried out in a time deterministic manner. That is, the execution of the instructions in the pipeline has a timing determined by a compiler which generates the program for each tile. In addition, internal data exchanges within the chip between tiles on the chip are also time deterministic. That is, the time at which data is to be transmitted from a transmitting tile to a recipient tile is known relative to the time at which the recipient tile receives that data. Nevertheless, the time at which the receive pipeline receives data relative to the operation of the execution pipeline on the tile is not known, and is considered to be asynchronous. Moreover, data incoming from externally of the chip is asynchronous A tile does not know when it might receive a piece of data which has come in externally of the chip through an external exchange mechanism. The chip 2 may be implemented alone on its own single chip integrated circuit package, or is one of multiple dies packaged in the same IC package. The on-chip interconnect may also be referred to herein as the exchange fabric 34 as it enables the tiles 4 to exchange data with one another. Each tile comprises a respective instance of the execution unit and memory described above. Each chip 2 may also comprise one or more external links 8 enabling the chip 2 to be connected to one or more external processes on different chips. These external links may comprise any one or more of: one or more chip to host links connecting the chip to a host processor, and/or one or more chip to chip links for connecting together with one or more other instances of the chip 2 on the same IC package or card, or on different card. Data received into the chip via the one or more external links is handled by the receive logic on each tile, as discussed above. Note that this data may be received asynchronously to the internal operation of each tile.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A processor comprising:
   memory;
   an execution pipeline having a first plurality of pipeline stages configured to execute an operation on data provided to the execution pipeline and to store a result of the operation into the memory;
   a receive pipeline having a second plurality of pipeline stages configured to handle incoming data to the processor and to store the incoming data into the memory; and
   context status storage configured to hold an exception indicator of an exception encountered by the receive pipeline while the receive pipeline handles the incoming data;
   wherein the receive pipeline is configured to determine in one of the second plurality of pipeline stages that an exception has been encountered, to operate in a final pipeline stage of the second plurality of pipeline stages to commit the exception indicator to the context status storage, and to continue to receive and store the incoming data into the memory until the exception indicator has been committed.

2. The processor of claim 1, wherein the execution pipeline is configured to check the context status storage when retiring an instruction and on detection of the exception indicator in the context status storage to cause an exception signal to be raised.

3. The processor of claim 1, wherein the receive pipeline is configured to drop subsequent incoming data after the exception indicator has been committed.

4. The processor of claim 1, wherein the receive pipeline is configured to process a first incoming data word sequentially in the second plurality of pipeline stages and to process one or more subsequent incoming data words in successive ones of the second plurality of pipeline stages, whereby multiple pipeline stages are configured to operate on successive data words at a same time.

5. The processor of claim 1, wherein the second plurality of pipeline stages are timed according to a clock signal.

6. The processor of claim 5, wherein the first plurality of pipeline stages are timed according to the clock signal.

7. The processor of claim 1, wherein the receive pipeline is configured to detect the exception in a first pipeline stage of the second plurality of pipeline stages.

8. The processor of claim 1, wherein the receive pipeline is configured to receive the incoming data in successive receive steps of successive data words, and wherein a number of receive steps which cause any incoming data word to be stored into memory between detection of the exception and commitment of the exception indicator correspond to one less than a number of pipeline stages in the second plurality of pipeline stages.

9. The processor of claim 1, wherein the execution pipeline and the receive pipeline are configured to operate contemporaneously, the processor further comprising access logic configured to resolve memory write conflicts of data from the execution pipeline and the receive pipeline.

10. The processor of claim 9, wherein the access logic is configured to prioritize a memory write of data from the receive pipeline over data from the execution pipeline in response to a memory access conflict.

11. A method of handling exceptions in a processor, the method comprising:
    handling incoming data, by a receive pipeline having a first plurality of pipeline stages, and storing the incoming data into memory of the processor;
    executing an operation on data, by an execution pipeline having a second plurality of pipeline stages, and storing a result of the operation into the memory of the processor;
    determining by the receive pipeline that an exception has been encountered in one of the pipeline stages of the first plurality of pipeline stages;
    committing an exception indicator to context status storage at a final pipeline stage of the first plurality of pipeline stages; and
    continuing to receive and store the incoming data into the memory until the exception indicator has been committed.

12. The method of claim 11, further comprising:
    checking the context status storage when retiring an instruction; and
    causing an exception signal to be raised on detection of the exception indicator in the context status storage.

13. The method of claim 11, further comprising:
    dropping subsequent incoming data after the exception indicator has been committed.

14. The method of claim 11, further comprising:
    processing a first incoming data word sequentially in the first plurality of pipeline stages;
    processing subsequent incoming data words in successive pipeline stages of the first plurality of pipeline stages, whereby multiple pipeline stages of the first plurality of pipeline stages are operating on successive data words at a same time.

15. The method of claim 11, further comprising timing the first plurality of pipeline stages and the execution pipeline according to a clock signal.

16. The method of claim 11, wherein the receive pipeline detects the exception in a first pipeline stage of the first plurality of pipeline stages.

17. The method of claim 11, wherein the incoming data comprises successive data words, and wherein a number of data words which are stored into the memory between detection of the exception and commitment of the exception indicator correspond to one less than a number of pipeline stages in the first plurality of pipeline stages.

18. The method of claim 11, wherein the execution pipeline and the receive pipeline operate contemporaneously, the method further comprising:
resolving memory write conflicts of data from the execution pipeline and the receive pipeline.

19. The method of claim 18, further comprising:
prioritizing a memory write of data from the receive pipeline over data from the execution pipeline in response to a memory access conflict.

20. A method comprising:
storing incoming data into memory of a processor by a receive pipeline having a first plurality of pipeline stages, wherein the processor further includes an execution pipeline having a second plurality of pipeline stages;
determining by the receive pipeline that an exception has been encountered in one of the first plurality of pipeline stages;
committing an exception indicator to context status storage at a final one of the first plurality of pipeline stages of the receive pipeline; and
continuing to receive and store the incoming data into the memory until the exception indicator has been committed.

21. The method of claim 20, further comprising:
checking the context status storage when retiring an instruction; and
causing an exception signal to be raised on detection of the exception indicator in the context status storage.

22. The method of claim 20, further comprising:
dropping subsequent incoming data after the exception indicator has been committed.

23. The method of claim 20, further comprising:
processing a first incoming data word sequentially in the first plurality of pipeline stages;
processing subsequent incoming data words in successive pipeline stages of the first plurality of pipeline stages, whereby multiple pipeline stages of the first plurality of pipeline stages are operating on successive data words at a same time.

24. The method of claim 20, further comprising timing the first plurality of pipeline stages and the execution pipeline according to a clock signal.

25. The method of claim 20, wherein the receive pipeline detects the exception in a first pipeline stage of the first plurality of pipeline stages.

26. The method of claim 20, wherein the incoming data comprises successive data words, and wherein a number of data words which are stored into memory between detection of the exception and commitment of the exception indicator correspond to one less than a number of pipeline stages in the first plurality of pipeline stages.

27. The method of claim 20, wherein the execution pipeline and the receive pipeline operate contemporaneously, the method further comprising:
resolving memory write conflicts of data from the execution pipeline and the receive pipeline.

28. The method of claim 27, further comprising:
prioritizing a memory write of data from the receive pipeline over data from the execution pipeline in response to a memory access conflict.

* * * * *